US008705059B2

(12) United States Patent  
Sekido et al.

(10) Patent No.: US 8,705,059 B2
(45) Date of Patent: Apr. 22, 2014

(54) IMAGE PROCESSING APPARATUS

(75) Inventors: Takamichi Sekido, Hachioji (JP); Takahiro Kitayama, Toyokawa (JP); Yasuaki Sugimoto, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 86 days.

(21) Appl. No.: 13/188,037

(22) Filed: Jul. 21, 2011

(65) Prior Publication Data

US 2012/0026524 A1 Feb. 2, 2012

(30) Foreign Application Priority Data

Jul. 28, 2010 (JP) .................................. 2010-169572

(51) Int. Cl.
*G06K 15/00* (2006.01)
*H04N 1/36* (2006.01)
*H04N 1/32* (2006.01)

(52) U.S. Cl.
CPC ............ *H04N 1/36* (2013.01); *H04N 1/32614* (2013.01)
USPC ........................... 358/1.13; 358/421; 358/437

(58) Field of Classification Search
USPC ............. 358/426.02, 419, 1.13, 437, 421, 1.1
See application file for complete search history.

(56) References Cited

U.S. PATENT DOCUMENTS

| 5,744,932 | A  | * | 4/1998  | Kissel ............................ 320/106 |
| 6,469,795 | B2 | * | 10/2002 | Beaudet et al. ............... 358/1.14 |
| 6,883,980 | B2 | * | 4/2005  | Guddanti ........................ 400/61 |
| 7,475,358 | B2 | * | 1/2009  | Anzelde et al. ................ 715/772 |
| 8,059,286 | B2 | * | 11/2011 | Yamada ........................ 358/1.13 |
| 2005/0179913 | A1 | * | 8/2005  | Fujii ............................... 358/1.1 |
| 2006/0245780 | A1 | * | 11/2006 | Yamada .......................... 399/81 |
| 2008/0164841 | A1 | * | 7/2008  | Nam ............................. 320/110 |
| 2009/0077559 | A1 | * | 3/2009  | Tajima .......................... 718/102 |
| 2010/0223384 | A1 | * | 9/2010  | Takeda et al. ................. 709/226 |
| 2011/0061057 | A1 | * | 3/2011  | Harris et al. .................. 718/104 |
| 2011/0193522 | A1 | * | 8/2011  | Uesugi .......................... 320/109 |
| 2011/0225571 | A1 | * | 9/2011  | Stanford-Jason ............. 717/145 |
| 2013/0006403 | A1 | * | 1/2013  | Moore et al. ................... 700/92 |
| 2013/0174181 | A1 | * | 7/2013  | Jentsch et al. ................ 719/328 |

FOREIGN PATENT DOCUMENTS

| JP | 7-271249    | 10/1995 |
| JP | 10-240481   | 9/1998  |
| JP | 2004-069895 | 3/2004  |
| JP | 2008-254285 | 10/2008 |

OTHER PUBLICATIONS

JP 10240481 A (Taniguchi)—English Machine Translation.*

* cited by examiner

*Primary Examiner* — Jerome Grant, II
(74) *Attorney, Agent, or Firm* — Finnegan, Henderson, Farabow, Garrett & Dunner, L.L.P.

(57) ABSTRACT

Disclosed is an image processing apparatus that can implement a job by effectively employing the charged electric power, generated and stored by the locally-equipped power generator, and can cope with such a job whose urgency level is specifically high. The apparatus includes a job implementing section to implement a job in regard to image data; an electric generator section; an electrical accumulator section; and a controlling section to change a job implementation mode between a first job implementation mode, in which the job is implemented by employing the electrical accumulator section after the electrical accumulator section is sufficiently charged by an electric power generated by the electric generator section, and a second job implementation mode, in which the job is instantaneously implemented by employing an external electric power source, when an amount of electric power charge, stored in the electrical accumulator section, is in short supply for implementing the job.

17 Claims, 14 Drawing Sheets

| | ALLOWABLE DELAY TIME | ESTABLISHED |
|---|---|---|
| DAY | 1 DAY | |
| | 2 DAYS | |
| | 3 DAYS | |
| | INPUT NUMBER OF DAYS | |
| HOUR | 1 HOUR | |
| | 2 HOURS | # |
| | 3 HOURS | |
| | 6 HOURS | |
| | 12 HOURS | |
| | 18 HOURS | |
| | INPUT NUMBER OF HOURS | |
| MINUTES | 10 MINUTES | |
| | 20 MINUTES | |
| | 30 MINUTES | |
| | 40 MINUTES | |
| | 50 MINUTES | |
| | INPUT NUMBER OF MINUTES | |

[ALLOWABLE DELAY TIME]

BY WHEN CONCERNED JOB SHOULD BE IMPLEMENTED?
PLEASE SELECT ONE OF OPTIONS OF ALLOWABLE DELAY TIME
OR PLEASE INPUT DESIRED ALLOWABLE DELAY TIME.

| DAY | 1 HOUR |
|---|---|
| HOUR | 2 HOURS |
| MINUTE | 3 HOURS |
| | 6 HOURS |
| | 12 HOURS |
| | 24 HOURS |
| | INPUT VALUE (OTHER THAN THE ABOVE) |

IMAGE PROCESSING APPARATUS

This application is based on Japanese Patent Application NO. 2010-169572 filed on Jul. 28, 2010, with Japan Patent Office, the entire content of which is hereby incorporated by reference.

BACKGROUND OF TILE INVENTION

The present invention relates to an image processing apparatus, and specifically relates to such an image processing apparatus that employs an electric power generated by a locally-equipped power generator, serving as privately-owned electric power facilities, to implement a job.

There has been such a drawback in a conventional image processing apparatus, which stores in advance an electric power generated by the locally-equipped power generator such as solar panels, etc., into a kind of an electrical accumulator, so as to use the above-stored electric power for implementing a job, such as a copying operation, a printing operation, a facsimile transmitting operation, etc., that the job cannot be implemented immediately, when the electric charge stored in the electrical accumulator is in short supply, compared to the electric power amount necessary for implementing the job concerned.

For instance, according to the technology set forth in Tokkaihei 10-240481 (Japanese Patent Application Laid-Open Publication), the system is so constituted that the operator can select any one of three options of halting the printing operation, only printing a currently printable number of paper sheets and waiting until the full recharging operation is completed so as to automatically commence printing all number of paper sheets at the time of completion of the recharging operation.

The urgency degrees of various kinds of jobs, such as a copying operation, a printing operation, a facsimile transmitting operation, etc., are different from each other, such as a job to be implemented immediately, another job that is not necessary to be implemented immediately, but can wait for a time, and so on. Further, there would be established a reserved job, a desired implementation commencing time of which is designated in advance, etc., and therefore, the timings for commencing the jobs would vary depending on the requests of the users.

According to such an image processing apparatus that can employ not only the electric power supplied from the normal power line coupled to the external power source (hereinafter, referred to as a normal electric power, for simplicity), but also the stored electric power generated and stored by the locally-equipped power generator in parallel, for instance, when the stored electric power is in short supply compared to the electric power amount necessary for implementing the job concerned, it is possible to immediately implements the concerned job by simply limiting the electric power source of the image processing apparatus concerned to the normal electric power only. However, according to the abovementioned controlling technology that straightforwardly employs the normal electric power even for implementing such the job that is not necessary to be implemented immediately, namely, the job that may be implemented after the recharging operation is fully completed, it is hardly said that the stored electric power is efficiently utilized, but there has remain some room to improve the conventional technology abovementioned from the energy saving efficiency point of view. Further, with respect to the reserved job, it is needless to say that the situation same as abovementioned is arisen when both a job to be implemented immediately and another job that is not necessary to be implemented immediately, but can wait for a time, exist.

Further, when it is impossible to print all of the total number of paper sheets to be printed in a job within a range of the electric charge amount (stored electric power amount), according to such the conventional technology that makes it possible to select any one of three options of halting the printing operation, only printing a currently printable number of paper sheets, and waiting until the recharging operation is fully completed so as to automatically commence printing all of the total number of paper sheets at the time when the recharging operation is fully completed, it has been impossible to cope with the job having a high degree of urgency, such that the user wishes to immediately commence the operation for printing all of the total number of paper sheets. Accordingly, there has arisen such a problem that the usability of the conventional apparatus as abovementioned is low.

SUMMARY OF THE INVENTION

To overcome the abovementioned drawbacks in conventional image processing apparatus, it is one of objects of the present invention to provide an image processing apparatus, which makes it possible not only to implement a job by effectively employing the charged electric power, generated and stored by the locally-equipped power generator, but also to cope with such a job whose urgency level is specifically high.

Accordingly, at least one of the objects of the present invention can be attained by any one of the image processing apparatuses, the method for controlling the job implementation process and the computer readable storage medium, described as follows.

(1) According to an image processing apparatus reflecting an aspect of the present invention, the image processing apparatus, comprises: a job implementing section to implement a job in regard to image data; an electric generator section; an electrical accumulator section; and a controlling section to change a job implementation mode between a first job implementation mode, in which the job is implemented by employing the electrical accumulator section after the electrical accumulator section is sufficiently charged by an electric power generated by the electric generator section, and a second job implementation mode, in which the job is instantaneously implemented by employing an external electric power source, when an amount of electric power charge, currently stored in the electrical accumulator section, is in short supply for implementing the job.

(2) According to another aspect of the present invention, in the image processing apparatus recited in item 1, a user can establish an allowable delay time during which the user may wait an implementation of the job; and, based on predetermined decision criteria including the allowable delay time, the controlling section changes the job implementation mode between the first job implementation mode and the second job implementation mode.

(3) According to still another aspect of the present invention, in the image processing apparatus recited in item 2, when the amount of electric power charge, currently stored in the electrical accumulator section, is in short supply for implementing the job, the controlling section notifies the user, who inputted the job concerned, of a massage indicating a shortage of electric power charge being necessary for implementing the job, and accepts a user's operation for establishing the allowable delay time.

(4) According to still another aspect of the present invention, in the image processing apparatus recited in item 3, when the amount of electric power charge, currently stored in the electrical accumulator section, is in short supply for implementing the job, the controlling section finds a charging time necessary for charging the electrical accumulator section before the implementation of the job is commenced so as to notify the user of the charging time in addition to the message.

(5) According to still another aspect of the present invention, in the image processing apparatus recited in item 2, the allowable delay time is established in advance.

(6) According to still another aspect of the present invention, in the image processing apparatus recited in item 5, the job is defined as a reserved job, an implementation commencement time of which is designated in advance; and the controlling section determines whether or not the amount of electric power charge, currently stored in the electrical accumulator section, is in short supply for implementing the reserved job, at the implementation commencement time of the reserved job.

(7) According to still another aspect of the present invention, in the image processing apparatus recited in any one of items 2-6, when the amount of electric power charge, currently stored in the electrical accumulator section, is in short supply for implementing the job, the controlling section finds a charging time necessary for charging the electrical accumulator section before the implementation of the job is commenced; and, when the charging time exceeds the allowable delay time, the controlling section employs the external electric power source for activating the job implementing section so as to instantaneously implement the job.

(8) According to still another aspect of the present invention, in the image processing apparatus recited in any one of items 2-6, after the electrical accumulator section is charged by an electric power generated by the electric generator section within the allowable delay time, the controlling section employs the electrical accumulator section for activating the job implementing section so as to implement the job.

(9) According to still another aspect of the present invention, in the image processing apparatus recited in item 1, accepting a user's establishment in regard to whether or not a user, who inputted the job, may wait an implementation of the job, the controlling section changes the job implementation mode between the first job implementation mode and the second job implementation mode, based on predetermined decision criteria including the user's establishment.

(10) According to still another aspect of the present invention, in the image processing apparatus recited in item 9, when the amount of electric power charge, currently stored in the electrical accumulator section, is in short supply for implementing the job, the controlling section notifies the user, who inputted the job concerned, of a massage indicating a shortage of electric power charge being necessary for implementing the job, and accepts the user's establishment.

(11) According to still another aspect of the present invention, in the image processing apparatus recited in item 10, when the amount of electric power charge, currently stored in the electrical accumulator section, is in short supply for implementing the job, the controlling section finds a charging time necessary for charging the electrical accumulator section before the implementation of the job is commenced so as to also notify the user of the charging time in addition to the message.

(12) According to still another aspect of the present invention, in the image processing apparatus recited in any one of items 1-11, when employing the electrical accumulator section for implementing the job, the controlling section waits to implement the job until an amount of electric charge, being necessary for implementing the job, is charged into the electrical accumulator section, and then, implements the job by employing the electrical accumulator section.

(13) According to a method for controlling a job implementation process reflecting still another aspect of the present invention, the method for controlling a job implementation process to be conducted in an image processing apparatus that is provided with a job implementing section to implement a job in regard to image data, an electric generator section and an electrical accumulator section, the method comprises: changing a job implementation mode between a first job implementation mode, in which the job is implemented by employing the electrical accumulator section after the electrical accumulator section is sufficiently charged by an electric power generated by the electric generator section, and a second job implementation mode, in which the job is instantaneously implemented by employing an external electric power source, when an amount of electric power charge, currently stored in the electrical accumulator section, is in short supply for implementing the job.

(14) According to a computer readable storage medium reflecting yet another aspect of the present invention, the computer readable storage medium stores a computer executable program for implementing a job in an image processing apparatus that is provided with a job implementing section to implement the job in regard to image data, an electric generator section and an electrical accumulator section, the program being executable by a computer to cause the computer to perform a process comprising: changing a job implementation mode between a first job implementation mode, in which the job is implemented by employing the electrical accumulator section after the electrical accumulator section is sufficiently charged by an electric power generated by the electric generator section, and a second job implementation mode, in which the job is instantaneously implemented by employing an external electric power source, when an amount of electric power charge, currently stored in the electrical accumulator section, is in short supply for implementing the job.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 shows a schematic diagram indicating an allowable delay time setting table to be used for setting an allowable delay time;

FIG. 10 shows a schematic diagram indicating an example of an allowable delay time setting screen to be displayed on a display section of an MFP embodied in the present invention;

DETAILED DESCRIPTION OF THE PREFERRED EMBODIMENT

Figure 1:
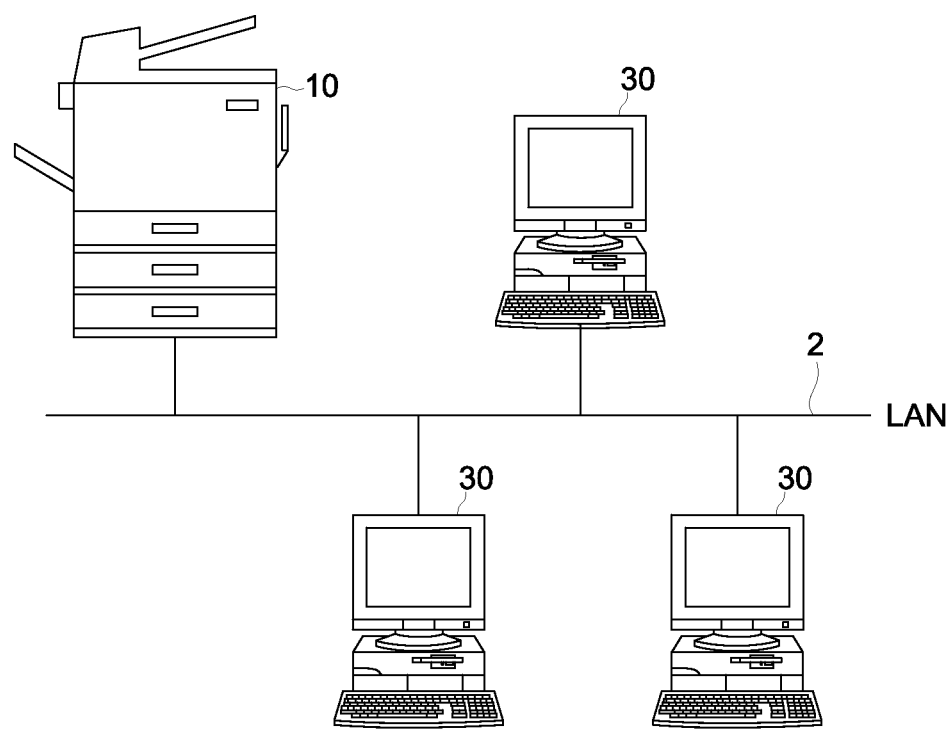
FIG. 1 shows a schematic diagram indicating a configuration of a system embodied in the present invention as the first embodiment.

Referring to the drawings, embodiments of the present invention will be detailed in the following.

<First Embodiment>

FIG. 1 shows a schematic diagram indicating a configuration of a system embodied in the present invention as the first embodiment. The system is constituted by an MFP (Multi-Functional Peripheral) 10, serving as an image processing apparatus and terminal devices 30, which are coupled to each other through a network 2, such as a LAN (Local Area Network) equipped in an office environment or the like.

The terminal devices 30 is provided with a function for transmitting a job, such as a scanning job, a printing job, etc., to the MFP 10, so as to request the MFP 10 to implement the concerned job. The terminal devices 30 is constituted by a personal computer in which various kinds of programs, such as an OS (Operating System) program, a driver program for the MFP 10, application programs for creating and editing documents and images, etc., are installed, etc. The various kinds of operations for transmitting a scanning job, a printing job, etc., to the MFP 10 and for requesting the MFP 10 to implement them, are conducted by executing the driver program used for driving the MFP 10.

Figure 2:
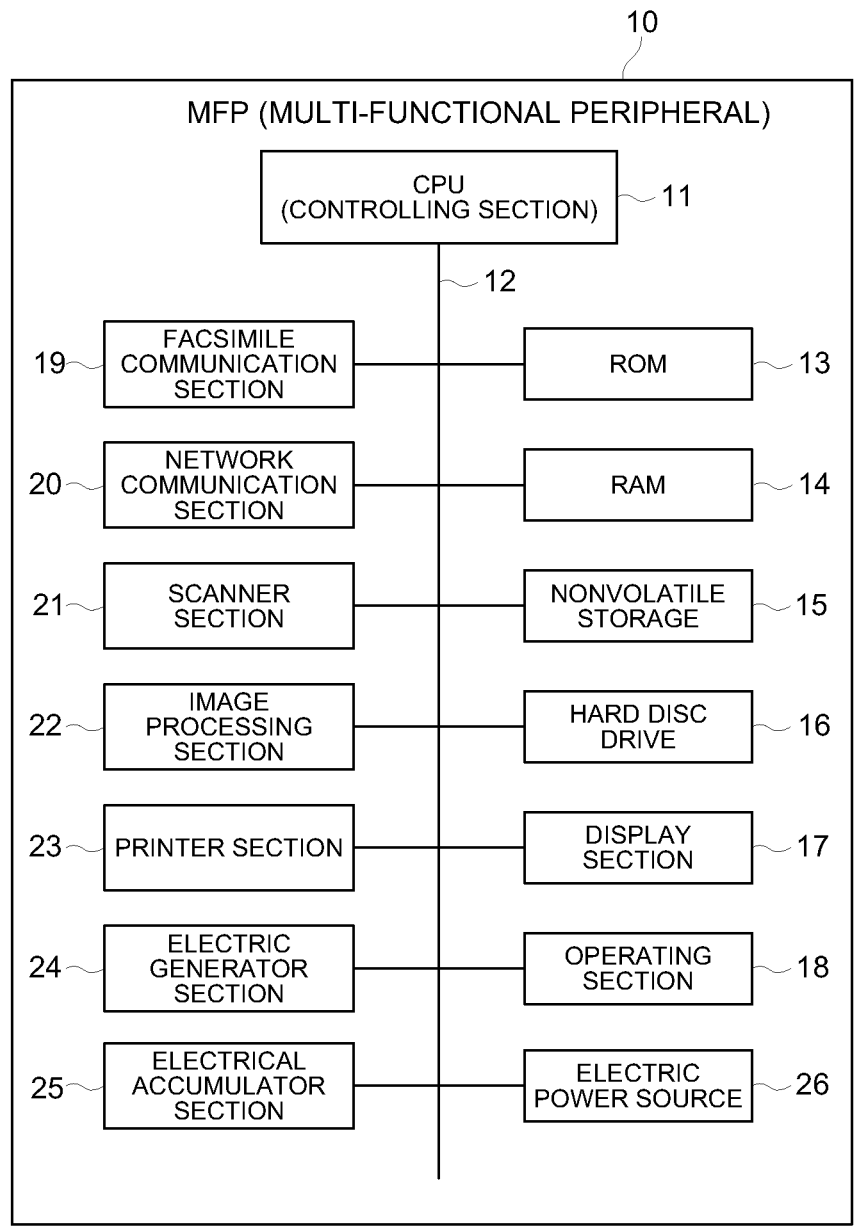
FIG. 2 shows a block diagram indicating a rough configuration of an MFP (Multi-Functional Peripheral) serving as an image processing apparatus embodied in the present invention.

FIG. 2 shows a block diagram indicating a rough configuration of the MFP 10. The MFP 10 is provided with a copy function for optically reading an image residing on a document and printing its copy image onto a recording medium so as to output the copy image printed on the recording medium, a scanning function for storing image data representing the image read from the document into a file and for transmitting the file to the terminal devices 30 or a server apparatus, a printing function for printing an image onto a recording medium based on the image data received from the terminal devices 30 or other image data stored in the MFP 10 so as to output the image printed on the recording medium, a facsimile function, etc.

In addition to the above, the MFP 10 is further provided with a storing function for storing electric power generated by a locally-equipped power generator, serving as privately-owned electric power facilities, into an electrical accumulator section so as to use the electric power stored in the electrical accumulator section for implementing the job concerned, and a switching function, which is to be activated when the electric charge amount currently stored in the electrical accumulator section for implementing the job concerned is in short supply, for switching a power supplying mode between an electrical accumulator supplying mode in which the concerned job is implemented by using the electric power supplied from the electrical accumulator section after the operation for recharging the electrical accumulator section is fully completed and an external power source supplying mode in which the concerned job is immediately implemented by using the normal electric power supplied from the external power source, based on predetermined decision criteria.

As shown in FIG. 2, the MFP 10 is constituted by a CPU (Central Processing Unit) 11 serving as a controlling section, a ROM (Read Only Memory) 13, a RAM (Random Access Memory) 14, a nonvolatile storage 15, a hard disc drive 16, a display section 17, an operating section 18, a facsimile communication section 19, a network communication section 20, a scanner section 21, an image processing section 22, a printer section 23, an electric generator section 24, an electrical accumulator section 25 and an electric power source 26, which are coupled to each other through a bus 12.

The CPU 11 executes the various kinds of programs stored in the ROM 13 so as to control various kinds of operations to be conducted in the MFP 10. The ROM 13 stores various kinds of programs to be executed by the CPU 11, and various kinds of data, therein. The RAM 14 selves as not only a working storage into which various kinds of data to be employed when the CPU 11 executes the programs are stored, but also an image data storage for temporarily storing image data. The nonvolatile storage 15 serves as a rewritable storage that is capable of retaining currently-stored data even when the electric power supplied thereto is turned OFF. The nonvolatile storage 15 stores information inherent to the apparatus concerned, various kinds of setting information, various kinds of tables, etc., therein. The hard disc drive 16 stores not only various kinds of archive data, but also various kinds of inputted image data or the like, therein.

The display section 17 is constituted by an LCD (Liquid Crystal Display), etc., so as to display various kinds of screens, such as an operating screen, a setting screen, a confirmation screen, etc. The operating section 18 is constituted by various kinds of operating buttons and keys, including a start button, a stop button, ten keys, etc., a touch panel mounted over the screen surface of the LCD to detect a coordinate position depressed by the user, etc., so as to accept various kinds of operations to be conducted for operating the MFP 10 by the user.

The facsimile communication section 19 transmits/receives image data to/from an external apparatus provided with the facsimile function through the public telephone line. The network communication section 20 communicates with the terminal devices 30 and/or a server apparatus through the network 2.

The scanner section 21 optically reads an image residing on a document so as to acquire the image data representing the image read from the document. For instance, the scanner section 21 is constituted by a light source to irradiate light onto the document, a line image sensor to receive the light reflected from the document so as to read one line image in a width direction of the document, a document shifting mechanism to incrementally shift the document in a longitudinal direction of the document one line by one line in a unit of the line image, an optical system that includes lenses an mirrors to guide the light reflected from the document to the line image sensor so as to focus the light thereon, an analogue to digital converter to convert the analogue signals outputted by the line image sensor to digital image data, etc.

The image processing section 22 applies various kinds of image processing, such as an image correction processing, an image rotation processing, an image-size enlargement/reduction processing, a data-size compression/expansion processing, etc., to the digital image data.

The printer section 23 forms a visible image represented by the digital image data onto the recording medium through the electro-photographic process. For instance, the printer section 23 serves as a laser printer that is constituted by: a conveyance mechanism to convey the recording medium; a photoreceptor drum; a charging device; a laser diode that emits a laser beam, intensity of which is modulated on the basis of the digital image data inputted; a scanning unit to scan the laser beam, emitted from the laser diode, onto the circumferential surface of the photoreceptor drum; a developing device; a transferring separation device; a cleaning device; and a fixing device. Other than the above, any kind of printer, such as an LED (Light Emitting Diode) printer that irradiates light emitted from light emitting diodes instead of the laser beam onto the photoreceptor drum, or any other type of printer, is also applicable in the present invention.

The electric generator section 24 is constituted by solar panels provided with a function for receiving solar light (natural light) or room illumination light so as to generate the electric power from the received light. The electrical accumulator section 25 accumulates and store the electric power generated by the electric generator section 24 therein, to supply the concerned electric power (stored electric power) to the various kinds of sections provided in the MFP 10. The electric power source 26 converts the voltage of the commercial power source (external power source) to an appropriate voltage and supplies the converted electric power to the various kinds of sections provided in the MFP 10. Further, the MFP 10 is so constituted that the activation mode of the electrical accumulator section 25 and the electric generator section 24 is changeable between a single use mode, in which only any one of them is activated as the total power source, and a simultaneous use mode, in which both of them are simultaneously activated as the total power source in parallel. The MFP 10 is operated to implement a job under the electric power supplied from the electrical accumulator section 25 and/or the electric power source 26.

Further, the CPU 11 (controlling section) is provided with various kinds of functions respectively corresponding to various kinds of sections including: an electric-charge amount calculating section to calculate the electric charge amount currently stored in the electrical accumulator section 25; an electric-power consumption amount calculating section to calculate an electric power amount to be consumed by the MFP 10 necessary for implementing a job; an electric-charge amount shortage determining section to determine whether or not the above-calculated electric charge amount currently stored in the electrical accumulator section 25 is in short supply, compared to the above-calculated power consumption amount for implementing the job concerned; an electric charge estimating section to calculate an estimated value of the electric charge amount to be charged (stored) into the electrical accumulator section 25 from now on (electric charge amount per unit time); a recharge time estimating section to calculate an estimated value of the recharging time based on the electric charge amount being short for implementing the job concerned and the estimated value of the electric charge amount; an allowable delay time setting section to accept a setting of an allowable time (allowable delay time) during which the implementation of the job concerned may be waited; and an electric power switching section to switch the electric power supplying mode for supplying the electric power to the various kinds of sections provided in the MFP 10, from one to another between the single use mode of stored electric power, the other single use mode of the normal electric power and the simultaneous use mode of them.

Figure 3:
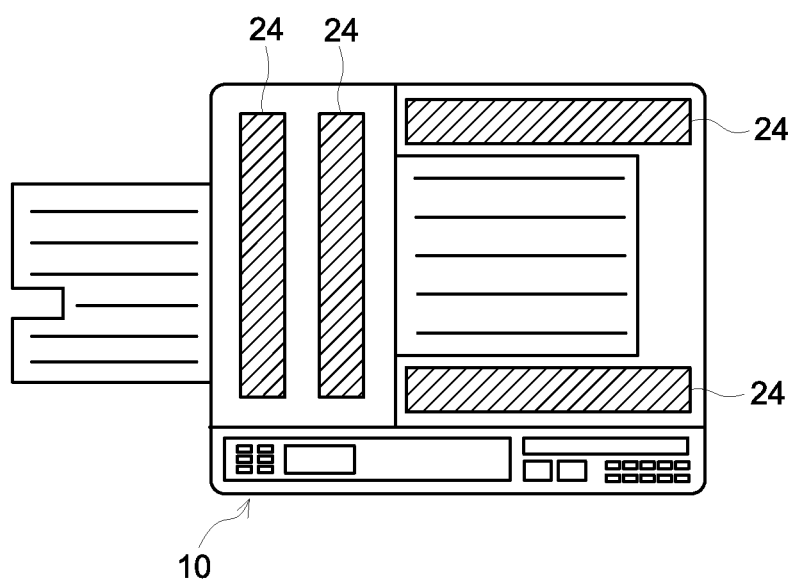
FIG. 3 shows a schematic diagram indicating a plane view of a configuration of an electric generator section provided in an MFP, including a layout for arranging solar panels thereon.

FIG. 3 shows a schematic diagram indicating a plane view of the configuration of the electric generator section 24 provided in the MFP 10, including a layout for arranging the solar panels. The MFP 10 is provided with a vacant space located above the upper surface of the apparatus proper. The electric generator section 24 is disposed within the vacant space located above the upper surface of the apparatus proper.

FIG. 4 shows a schematic diagram indicating an allowable delay time setting table 40 to be used for setting the allowable delay time. The allowable delay time setting table 40 is stored in the nonvolatile storage 15.

The allowable delay time is defined as such a period during which the delay of the implementation commencement of the job concerned can be allowed, and is established in units of "day", "hour" and "minutes" as the time duration elapsed from the present (job inputting time point). In the present embodiment, a plurality of options is provided for each of units of "day", "hour" and "minutes", or alternatively, a arbitral value for each of them can be inputted. According to the allowable delay time setting table 40 of the present embodiment, the options for the unit of "day" are provided as three kinds of options including "one day", "two days" and "three days", while, the options for the unit of "hour" are provided as six kinds of options including "one hour", "two hours", "three hours", "six hours", "twelve hours", and "eighteen hours", and the options for the unit of "minutes" are provided as five kinds of options including "ten minutes", "twenty minute", "thirty minutes", "forty minutes" and "fifty minutes, at ten-minutes intervals.

The allowable delay time can be established by designating any one of the abovementioned options in the unit of "day", "hour" or "minutes" or inputting the arbitral value desired by the user, or by designating any combination of the abovementioned options respectively selected in the units of "day", "hour" and "minutes" and/or the arbitral value inputted. For instance, it is possible to establish "1.5 days" as the allowable delay time by combining "one day" selected from the options in the unit of "day" with "twelve hours" selected from the options in the unit of "hour". Further, it is also possible to establish "1 hour and 15 minutes" as the allowable delay time by combining "one hour" selected from the options in the unit of "hour" with "15 minutes" inputted as the desired value. Further, when the user wishes to immediately implements the job concerned without allowing any delay, it is also possible to establish "zero" as the allowable delay time by inputting zero (0) as the desired value.

In the allowable delay time setting table 40, the option or the inputted value, which is determined as effective, is flagged. For instance, when two hours is established (selected) as the allowable delay time, as shown in FIG. 4, the option corresponding to "two hours" is flagged by symbol "#". Further, when an arbitral value, desired by the user, is inputted and established as any one of the inputted values of "day", "hour" and "minutes", the inputted values is written into the allowable delay time setting table 40 and is also flagged by symbol "#".

Next, the operations to be conducted in the MFP 10 will be detailed in the following.

FIG. 5 through FIG. 8 show flowcharts indicating the operations for implementing a job to be conducted by the MFP 10.

Figure 5:
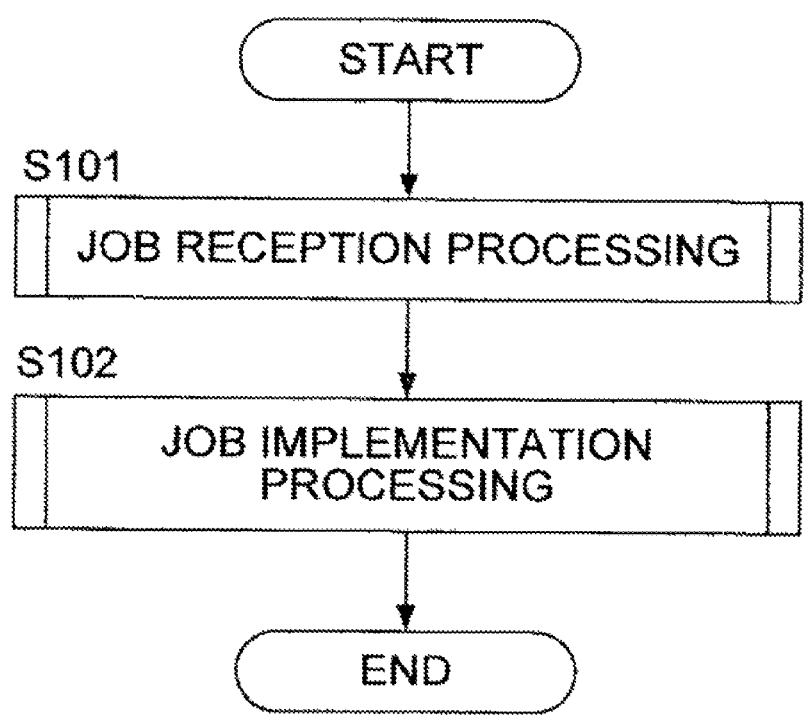
FIG. 5 shows a flowchart indicating a flow of operations for implementing a job to be conducted in an MFP.

In such a case that the MFP 10 is going to receive a request of implementing a job, such as a copy job, a scanning transmission job (scanning transmission job to be transmitted to the terminal devices 30 or the server apparatus) and a facsimile transmission job, from the user, for instance, when receiving an operation for selecting a kind of job, etc., or when receiving a request of implementing the print job from the terminal device 30 currently used by the user, the MFP 10 performs the operations (fundamental operations) indicated in the flowchart shown in FIG. 5.

When receiving the request of implementing a job (START), the CPU 11 of the MFP 10 conducts the processing for accepting the job concerned (Step S101, indicated by the subroutine shown in FIG. 6), and successively, conducts the processing for implementing the job above-accepted (Step S102, indicated by the subroutine shown in FIG. 7), and then, finalizes the operations for implementing the job concerned (END).

Figure 6:
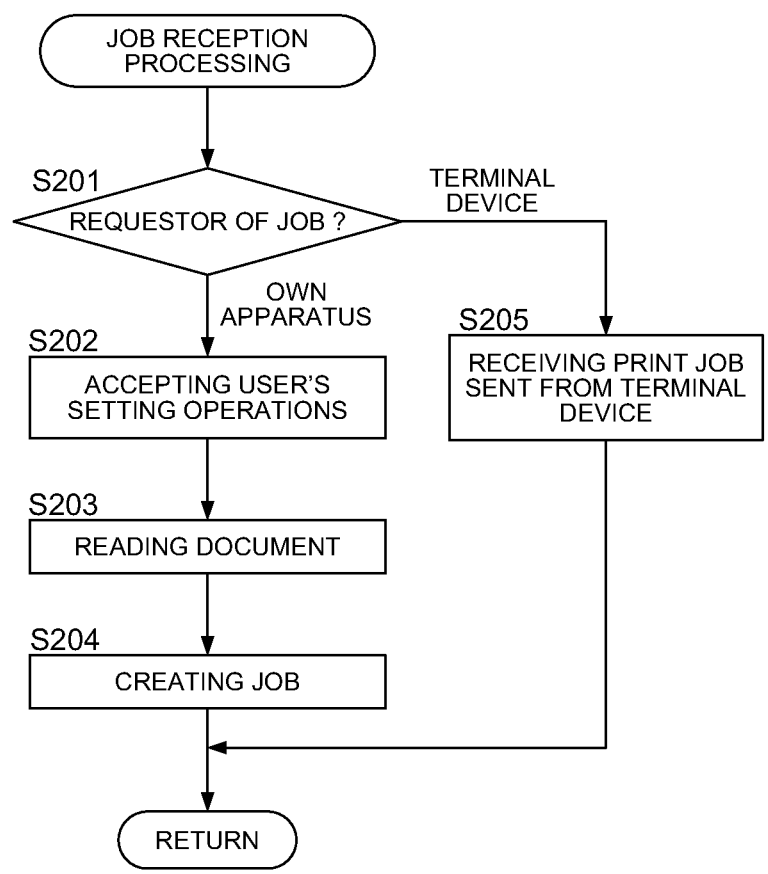
FIG. 6 shows a flowchart indicating a subroutine of a job reception processing (Step S101, indicated by the flowchart shown in FIG. 5)

In the job reception processing shown in FIG. 6, when the requestor of the job is the user who currently uses the MFP 10 concerned (Step S201; Own apparatus), the CPU 11 accepts the job setting operations (for the copy job, the scanning transmission job, the facsimile transmission job, etc.) inputted by the user through the display section 17 and the operating section 18 (Step S202). The abovementioned job setting operations include the establishment of the allowable delay time.

Figure 9:
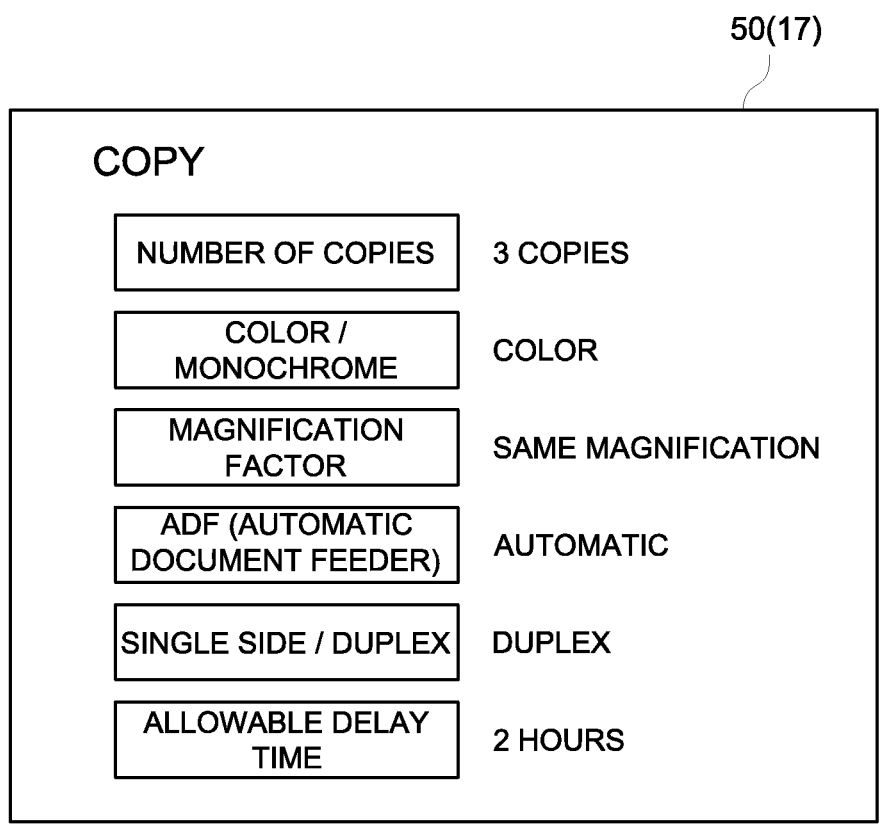
FIG. 9 shows a schematic diagram indicating an example of a copy setting screen to be displayed on a display section of an MFP embodied in the present invention.

FIG. 9 shows a schematic diagram indicating an example of a copy setting screen 50 to be displayed on the display section 17 for setting the copy job. As shown in FIG. 9, various kinds of setting items, including a number of copies, a color or monochrome mode, a magnification factor, a size of document, a single side or duplex printing, etc., are provided as the setting items concerning to the printing in the copy setting screen 50, and in addition, the item for the allowable delay time are also provided therein.

Through the copy setting screen 50, it is possible for the user to establish not only the various kinds of items concerning to the printing operation of the copy job, the implement of which is to be requested to the MFP 10, but also the allowable delay time. The details of the allowable delay time are established through a separate screen. In the present embodiment, when the user selects the item for the allowable delay time from the items displayed on the copy setting screen 50, the MFP 10 displays an allowable delay time setting screen 60 shown in FIG. 10 on the display section 17.

As described in the foregoing, the allowable delay time setting screen 60 is used for establishing the allowable delay time in the units of "day", "hour" and "minutes". It is possible for the user to establish the allowable delay time in detail by selecting any one of the options for each of the units of "day", "hour" and "minutes" or by inputting an arbitral value into the screen, or by designating any combination of the abovementioned options respectively selected in the units of "day", "hour" and "minutes" and/or the arbitral value inputted. In this connection, the schematic diagrams, shown in FIG. 9 and FIG. 10, indicate such the state that the item of "two hours" is established (selected) as the allowable delay time.

Further, with respect to the scanning transmission job or the facsimile transmission job, the various kinds of items (such as an image quality, an address, etc.) concerning the operations for scanning the document and transmitting the image data thereof, and the allowable delay time are established though a scanning setting screen or a facsimile setting screen (both not shown in the drawings) as well as the above.

The setting information of the allowable delay time, accepted from the user through the setting screens abovementioned, are stored into the allowable delay time setting table 40 aforementioned by referring to the table shown in FIG. 4.

Finalizing the operations for setting the job concerned (Step S202, shown in FIG. 6), the user sets the document, for which any one of the copy job, the scanning transmission job and the facsimile transmission job is to be implemented, onto the MFP 10, and then, depresses the start button so as to load the concerned job into the MFP 10.

In the MFP 10, accepting the user's operations for establishing the setting items of the job concerned and depressing the start button (Step S202), the CPU 11 activates the scanner section 21 to read the document, and then, temporarily stores the image data, acquired by the abovementioned reading actions, into the RAM 14 (Step S203). Finalizing the operation for reading the document, the CPU 11 creates a job (job data) and again temporarily stores the job data into the RAM 14 (Step S204 through RETURN).

On the other hand, when the requestor of the job is the user who currently operates the terminal device 30 (Step S201; terminal device), the CPU 11 of the MFP 10 receives the print job (print data) sent from the terminal devices 30 and temporarily stores the print job concerned into the RAM 14 (Step S205 through RETURN). In this connection, with respect to the print job, the user establishes the various kinds of setting items concerning to the printing (including a number of copies, a color or monochrome mode, a magnification factor, a single side or duplex printing, etc.), and the allowable delay time, through the print setting screen displayed on the terminal devices 30 by executing the driver program. The terminal devices 30 creates the print job including the above-established printing conditions and the allowable delay time, so as to transmit the created print job to the MFP 10.

Figure 7:
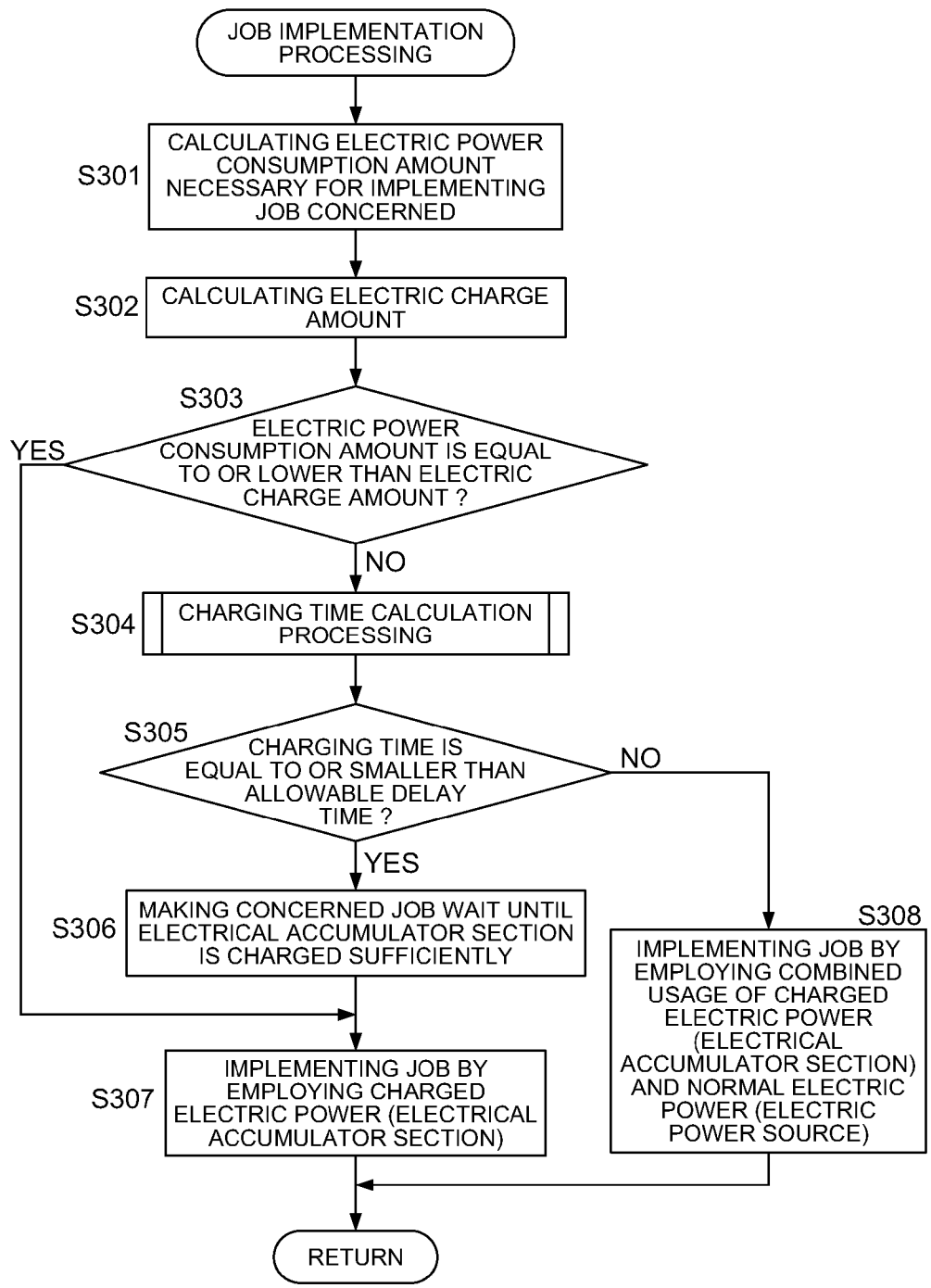
FIG. 7 shows a flowchart indicating a subroutine of a job implementation processing (Step S102, indicated by the flowchart shown in FIG. 5)

In the flowchart of the job implementation processing shown in FIG. 7, the CPU 11 calculates the electric power consumption amount, which is necessary for the MFP 10 to implement the job concerned (Step S301).

For instance, the electric power to be consumed for implementing the printout operations varies depending on the rotation number or the rotation velocity of the photoreceptor drum, etc., and various kinds of environmental conditions, such as a atmospheric temperature, etc., affect the electric power to be consumed in the driving system thereof. To cope with the above problems, it is applicable that an electric power consumption amount per one printing paper sheet is stored in advance as the internal data (table value), so as to employ the internal data for calculating the electric power to be consumed for implementing the printout operations. Further, with respect to the job to be transmitted, it is also applicable that an electric power consumption amount per one printing paper sheet is stored in advance as the internal data (table value), so as to employ the internal data for calculating the electric power to be consumed for implementing the printout operations.

<Calculation Examples in Regard to Printout Operation/ Transmitting Operation>

IN CASE OF PRINTOUT OPERATION (ELECTRIC POWER CONSUMPTION AMOUNT)=
(NUMBER OF PRINTOUTS)×(ELECTRIC
POWER CONSUMPTION AMOUNT
REQUIRED FOR PRINTING ONE PAPER
SHEET(TABLE VALUE))

IN CASE OF TRANSMITTING OPERATION (ELECTRIC POWER CONSUMPTION AMOUNT)=
(NUMBER OF PAPER SHEETS TO BE
TRANSMITTED)×(ELECTRIC POWER CON-
SUMPTION AMOUNT REQUIRED FOR
TRANSMITTING ONE PAPER SHEET
(TABLE VALUE))

Further, with respect to the electric power to be consumed for implementing the printout operations, it is applicable that, other than the number of printout paper sheets, various kinds of printing conditions, such as a color or monochrome mode, a single side or duplex printing, etc., are taken into account. According to such the printing conditions, it is possible to calculate the electric power consumption amount while taking the printing condition into account, by storing the electric power consumption amount per one printing paper sheet, corresponding to the printing condition concerned, in advance as the internal data (table value).

<Calculation Examples in Regard to Color Printout Mode/ Monochrome Printout Mode>

IN CASE OF COLOR PRINTOUT MODE (ELECTRIC POWER CONSUMPTION AMOUNT)=
(NUMBER OF PRINTOUTS)×(ELECTRIC
POWER CONSUMPTION AMOUNT
REQUIRED FOR PRINTING ONE PAPER
SHEET IN COLOR PRINTOUT MODE
(TABLE VALUE))

IN CASE OF MONOCHROME PRINTOUT MODE (ELECTRIC POWER CONSUMPTION AMOUNT)=
(NUMBER OF PRINTOUTS)×(ELECTRIC
POWER CONSUMPTION AMOUNT
REQUIRED FOR PRINTING ONE PAPER
SHEET IN MONOCHROME PRINTOUT
MODE(TABLE VALUE))

Successively, the CPU 11 calculates the electric charge amount currently stored in the electrical accumulator section 25 (Step S302). The operation for calculating the electric charge amount is implemented by employing a well-known method, for instance, converting the output voltage of the electrical accumulator section 25 to the current electric charge amount, etc.

Still successively, the CPU 11 compares the electric power consumption amount and the current electric charge amount with each other (Step S303). When determining that the electric power consumption amount is equal to or lower than the current electric charge amount (the current electric charge amount fulfills the electric power consumption amount) (Step S303; Yes), the CPU 11 changes the power supplying source to the electrical accumulator section 25 in order to employ the charged electric power for activating the MFP 10 so as to implement the job concerned (Step S307 through RETURN).

Figure 8:
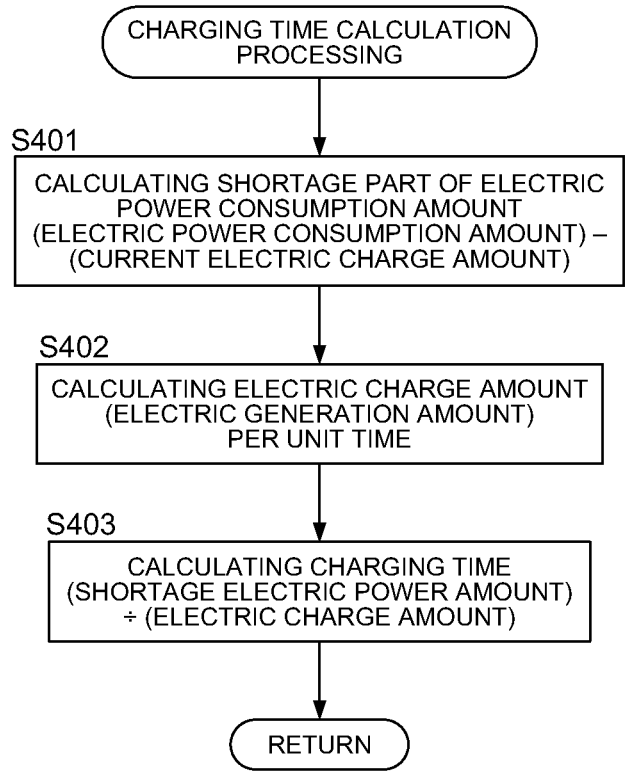
FIG. 8 shows a flowchart indicating a subroutine of a charging time calculation processing (Step S304, indicated by the flowchart shown in FIG. 7)

On the other hand, when determining that the electric power consumption amount exceeds the current electric charge amount (the current electric charge amount is in short supply compared to the electric power consumption amount), the CPU 11 conducts the charging time calculation processing (Step S304, indicated by the subroutine shown in FIG. 8).

In the charging time calculation processing indicated by the flowchart shown in FIG. 8, since the electric charge amount currently stored in the electrical accumulator section 25 is in short supply compared to the electric power consumption amount necessary for implementing the job concerned, the CPU 11 calculates the shortage part of the electric power consumption amount (hereinafter, referred to as the shortage electric power amount) (Step S401). The shortage electric power amount can be found by subtracting the current electric charge amount from the electric power consumption amount, as indicated by the following Equation.

(SHORTAGE ELECTRIC POWER AMOUNT)=
(ELECTRIC POWER CONSUMPTION
AMOUNT)−(CURRENT ELECTRIC CHARGE
AMOUNT)

Successively, the CPU 11 calculates the electric charge amount per unit time at the electrical accumulator section 25 to be charged from now on (Step S402). For instance, the system is so constituted that the electric generation amount, which represents the electric power amount to be generated per unit time (for instance, one minutes, ten minutes, thirty minutes, etc.) by the electric generator section 24, is sequentially acquired and stored/revised so as to calculate the electric charge amount abovementioned on the basis of the electric generation amount revised at the latest opportunity. Concretely speaking, when it is necessary to calculate the electric charge amount per one minute, which is to be charged from now on, it is applicable that the electric generation amount is sequentially acquired and stored/revised at one minute intervals, so as to calculate the electric charge amount per one minute, which is to be charged from now on, from the latest value of the electric generation amount per one minute currently stored. Alternatively, when it is necessary to calculate the electric charge amount per one minute, which is to be charged from now on, it is applicable that the electric generation amount is sequentially acquired and stored/revised at ten minutes intervals, so as to calculate the electric charge amount per one minute, which is to be charged from now on, by dividing the latest value of the electric generation amount per ten minutes currently stored by 10 (average value per one minute within the latest 10 minutes interval).

Still successively, the CPU 11 divides the shortage electric power amount, calculated in Step S401, by the electric charge amount per unit time (one minute), which is to be charged from now on and calculated in Step S402, so as to calculate the charging time (Step S403 through RETURN).

In this connection, when the MFP 10 is used in an office environment or the like, since the lighting in the office is turned OFF in the noon recess, the night time, etc., the light receiving condition (electric generating efficiency) at the electric generator section 24 would vary. To cope with the abovementioned problem, it is applicable that, when the time of the lighting at the site into which the MFP 10 is installed has been determined in advance, the abovementioned charged amount is calculated by taking the change of the light receiving condition into account. For instance, it is applicable that the MFP 10 is configured to make it possible to set the lights-out time of the lighting at its installation site, and to acquire the data of the electric generation amount from the actual measurements to store the acquired data into the nonvolatile storage 15 in advance, so as to calculate the electric charge amount at the lights-out time by employing the concerned data stored in advance.

Returning to the flowchart of the job implementation processing shown in FIG. 7, when finalizing the charging time calculation processing in Step S304, the CPU 11 compares the calculated charging time with the allowable delay time established for the job concerned (Step S305). As aforementioned, as for the job (any one of the copy job, the scanning transmission job, the facsimile transmission job, etc.) inputted into the MFP 10 concerned, the allowable delay time is stored in the allowable delay time setting table 40 (information in which the day/the hour/the option of minutes/the inputted value are flagged). When the print job is received from the terminal devices 30, the allowable delay time is included into the print job concerned.

Successively, when determining that the calculated charging time is equal to or smaller than the allowable delay time (Step S305; Yes), the CPU 11 makes the concerned job wait in the standby state until the electrical accumulator section 25 is charged to such an extent that its charged amount is reached to a level necessary for implementing the job concerned (Step S306), Then, at the time when the charging operation of the electrical accumulator section 25 is completed, the CPU 11 changes the electric power source to the electrical accumulator section 25, so as to activate the MFP 10 to implement the job by employing the charged electric power supplied therefrom (Step S307 through RETURN).

In this connection, it is also applicable that, when making the concerned job wait in the standby state, the CPU 11 conducts such a managing operation that the CPU 11 moves the data of the concerned job, which is temporarily stored into the RAM 14, to the nonvolatile storage 15 or the hard disc drive 16 (evacuation storing operation).

On the other hand, when determining that the calculated charging time is greater than the allowable delay time (Step S305; No), the CPU 11 changes the electric power supplying mode to the combined usage supplying mode in which the electric power is supplied from the electrical accumulator section 25 and the electric power source 26 in parallel, so as to employ the charged electric power while making the normal electric power compensate for the shortage of the charged electric power to normally operate the MFP 10, in order to instantaneously implement the job concerned (Step S308 through RETURN).

In this connection, although the allowable delay time itself is directly designated (established) by the user in the present embodiment, as aforementioned, it is also applicable that the user designates the job completion time desired by the user concerned, so that the CPU 11 calculates the allowable delay time from the job completion time, designated by the user and the present time (job inputted time), by using the Equation indicated as follow.

(allowable delay time)=(job completion time)−(present time)

Figure 11:
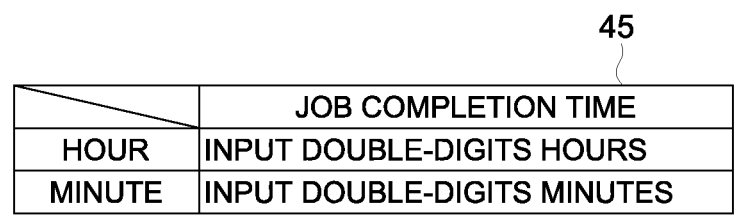
FIG. 11 shows a schematic diagram indicating an example of a job completion time setting table.

FIG. 11 shows a schematic diagram indicating an example of a job completion time setting table 45 in which information of the job completion time ( O'clock  Minutes) is to be stored when the user establishes the job completion time.

As described in the foregoing, according to the MFP 10 embodied in the present invention, when determining that an amount of electric power, currently charged in the electrical accumulator section 25, is in short supply for implementing a job, the CPU 11 changes the electric power supplying mode to such the mode in which the implementation of the concerned job is made to wait until the electrical accumulator section 25 is sufficiently charged by the electric power generated by the electric generator section 24 so as to employ only the electrical accumulator section 25 (charged electric power) for implementing the job concerned, or the other mode in which the electric power fed from the electric power source 26 (normal electric power) is employed for instantaneously implementing the job concerned, based on the allowable delay time established in regard to the job concerned.

For instance, when the user wishes to give a priority to the rapid start of the job implementation, by establishing the allowable delay time at zero (0), it is possible to employ the electric power source 26 for instantaneously implementing the job concerned, even if the amount of electric power, currently charged in the electrical accumulator section 25, is in short supply for implementing the job concerned. On the other hand, when the user wishes to give a priority to the energy saving aspect of the job implementation, by establishing the allowable delay time at a long time, it is possible to start the implementation of the job concerned, immediately after the operation for charging the electrical accumulator section 25 is completed within the allowable delay time, and as a result, it becomes possible to effectively use the charged electric power for implementing the job concerned.

Therefore, according to the image processing apparatus embodied in the present invention, it becomes possible not only to suppress the consumption of the normal electric power by effectively employing the charged electric power, generated and stored by the locally-equipped power generator, for implementing the job concerned, but also to cope with such the job whose urgency level is specifically high. Accordingly, it becomes possible to achieve a good balance between the urgency of the job concerned and the energy saving aspect of the job implementation.

<Second Embodiment>

The second embodiment, in which the changeover controlling operation of the power source (electric power) to be used for implementing the job, as described in the first embodiment, is applied for a reserved job, will be detailed in the following.

Hereinafter, a reserved job is defined as such a job that is reserved in advance by the user who designates the desired implementation commencement time of the job concerned. The implementation commencement time to be designated by the user in regard to the reserved job concerned may be either the clock time when the reserved job concerned is actually commenced (job implementation commencement clock time) or the transit time that has elapsed from the designated time point (present time) to the time when the reserved job concerned is actually commenced. In addition, even for the reserved job concerned, the user establishes an allowable time interval within which the user may further wait the implementation of the reserved job concerned since the implementation commencement time thereof has arrived, namely, the user establishes the allowable delay time indicating a time interval during which the delay of the implementation of the reserved job concerned can be allowed by the user concerned.

Figure 12:
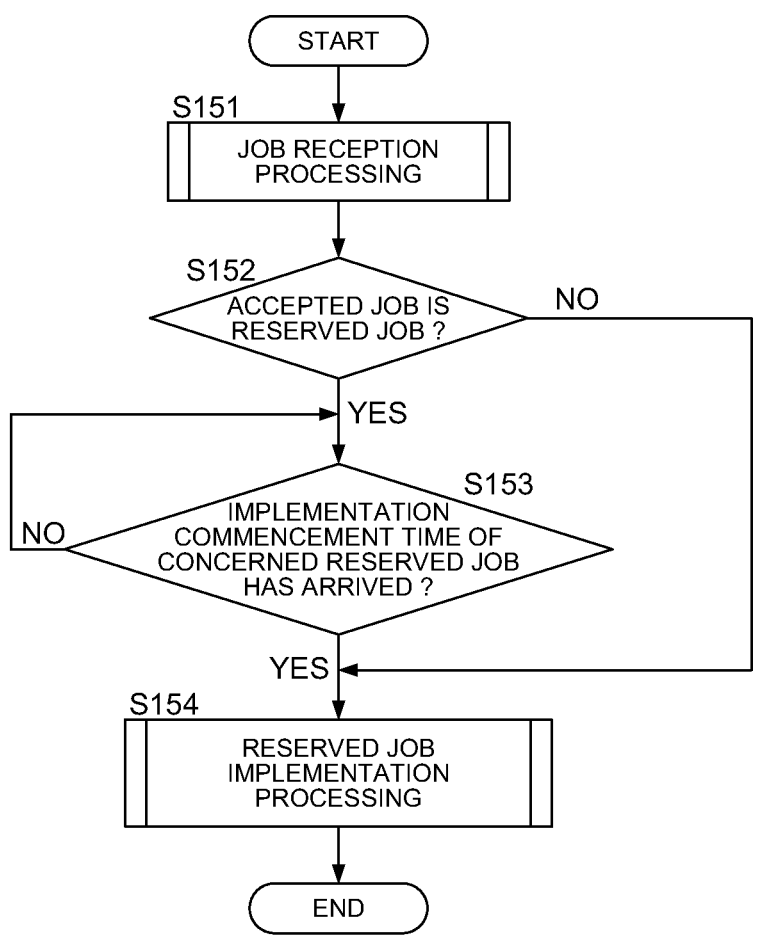
FIG. 12 shows a flowchart indicating a flow of operations to be conducted by an MFP, embodied in the present invention as the second embodiment, when implementing a job (including a reserved job)

FIG. 12 shows a flowchart indicating a flow of operations to be conducted by the MFP 10, embodied in the present invention as the second embodiment, when implementing a job (including a reserved job).

When receiving a request for implementing a copy job or a facsimile transmission job in the MFP 10 (own apparatus) from the user, for instance, when receiving an operation for selecting a kind of job, etc., or when receiving a request for implementing a print job from the terminal devices 30 currently used by the user, the MFP 10 conducts the operations (fundamental operations) indicated in the flowchart shown in FIG. 12.

Initially, when receiving a request for implementing a job (START), the CPU 11 provided in the MFP 10 conducts the job reception processing for accepting the job concerned (Step S151). The flowchart of the job reception processing shown in FIG. 12 is formed by adding the reserved job to the request-accepting job, described as the first embodiment referring to the flowchart shown in FIG. 6. Hereinafter, referring to the flowchart shown in FIG. 6, added points will be detailed in the following.

When accepting the reserved job, such as the copy job, the facsimile transmission job, etc., sent from the user, the MFP 10 (CPU 11) accepts the designation as the reserved job and the designation of the implementation commencement time in addition to the settings of the various kinds of items (parameters) in regard to the printing operation, the transmitting operation, etc., and the setting of the allowable delay time, at the time when setting the reserved job concerned (Step S202). When the user loads the document onto the MFP 10 after completing the operations for setting the job, and then, when the user depresses the start button so as to input the job concerned, the CPU 11 activates the scanner section 21 to read the document, and then, temporarily stores the image data acquired by reading the document into the RAM 14 (Step S203). Completing the operation for reading the document, the CPU 11 creates information indicating the reservation designation (designation as the reserved job) and the reserved job (job data) including the implementation commencement time designated by the user, so as to temporarily store them into the RAM 14 (Step S204).

When designating the print job, which is to be requested to the MFP 10 by the terminal devices 30, as the reserved job, the user performs the operations for designating the print job as the reserved job and the implementation commencement time, in addition to the operations for setting the various kinds of items (parameters) in regard to the printing operation, the transmitting operation, etc., and the allowable delay time, at the time when setting the reserved job concerned, so as to input the concerned print job as the reserved job. The terminal devices 30 creates the print job (reserved job) that includes the printing conditions and the allowable delay time established by the user, the information indicating the reservation designation (designation as the reserved job) and the implementation commencement time designated by the user, and transmits the created print job to the MFP 10. The MFP 10 (CPU 11) receives the concerned print job from the terminal devices 30, and temporarily stores the concerned print job into the RAM 14 (Step S205).

In this connection, it is also applicable that the reserved job is stored into either the nonvolatile storage 15 or the hard disc drive 16, instead of the RAM 14, so as to properly control the reserved job concerned.

Returning to the flowchart shown in FIG. 12, when completing the job reception processing to be conducted in Step S151, the CPU 11 determines whether or not the accepted job (inputted job) is the reserved job (Step S152). When determining that the accepted job is not the reserved job (Step S152; No), the CPU 11 conducts the operations for implementing the job concerned (Step S154), and then, finalizes the operations in regard to the implementation of the job concerned (END). Since the contents of the job implementation processing to be conducted in Step S154 are the same as those described in the first embodiment referring to the flowchart shown in FIG. 7, the explanations for them are omitted herein.

On the other hand, when determining that the accepted job is the reserved job (Step S152; Yes), the CPU 11 monitors whether or not the implementation commencement time of the concerned reserved job has arrived (Step S153; No). When determining that the implementation commencement time of the concerned reserved job has arrived (Step S153; Yes), the CPU 11 conducts the operations for implementing the reserved job concerned (Step S154), and then, finalizes the operations in regard to the implementation of the reserved job concerned (END).

In Step S302 of the implementation processing for the reserved job, indicated in the flowchart shown in FIG. 7, the CPU 11 calculates the electric charge amount currently stored in the electrical accumulator section 25 at the implementation commencement time of the reserved job. Then, when determining that an amount of electric power, currently charged in the electrical accumulator section 25, is in short supply for implementing the reserved job concerned, the CPU 11 changes the electric power supplying mode to such the mode in which the implementation of the concerned reserved job is made to wait until the electrical accumulator section 25 is sufficiently charged by the electric power generated by the electric generator section 24 so as to employ only the electrical accumulator section 25 (charged electric power) for implementing the reserved job concerned, or the other mode in which the electric power fed from the electric power source 26 (normal electric power) is employed for instantaneously implementing the reserved job concerned, based on the allowable delay time established in regard to the reserved job concerned.

As described in the foregoing, according to the MFP 10 embodied in the present invention as the second embodiment, with respect to the reserved job for which the implementation commencement time is designated, when the implementation commencement time of the concerned reserved job has arrived, the CPU 11 determines whether or not an amount of electric power, currently charged in the electrical accumulator section 25, is in short supply for implementing the reserved job concerned. When determining that the amount of electric power is in short supply, the CPU 11 changes the electric power supplying mode to such the mode in which the electrical accumulator section 25 is continuously charged by the electric generator section 24 even after the implementation commencement time of the concerned reserved job has arrived, while the actual implementation of the concerned reserved job is made to wait until the electrical accumulator section 25 is sufficiently charged by the electric power generated by the electric generator section 24 so as to employ only the electrical accumulator section 25 (charged electric power) for implementing the reserved job concerned, or the other mode in which the electric power fed from the electric power source 26 is employed for instantaneously implementing the reserved job concerned, based on the allowable delay time established in regard to the concerned reserved job in advance.

For instance, when the user wishes to start the implementation of the concerned reserved job at the implementation commencement time designated in advance, by establishing the allowable delay time at zero (0), it is possible to employ the electric power source 26 for instantaneously implementing the reserved job concerned at the implementation commencement time designated in advance, even if the amount of electric power, currently charged in the electrical accumulator section 25, is in short supply for implementing the reserved job concerned. On the other hand, when the user wishes to give a priority to the energy saving aspect of the job implementation, by establishing the allowable delay time at a long time, it is possible to activate the electric generator section 24 so as to continuously charge the electrical accumulator section 25 even after the implementation commencement time of the reserved job concerned has arrived, and to start the implementation of the reserved job concerned, immediately after the operation for charging the electrical accumulator section 25 is completed within the allowable delay time. As a result, it becomes possible to effectively use the charged electric power for implementing the job concerned.

Therefore, according to the image processing apparatus embodied in the present invention as the second embodiment, even for a reserved job, it becomes possible not only to suppress the consumption of the normal electric power by effectively employing the charged electric power, generated and stored by the locally-equipped power generator, for implementing the job concerned, but also to cope with even such the reserved job that is wished to start at the implementation commencement time designated in advance by the user.

<Third Embodiment>

Although the allowable delay time for the job to be inputted is designated in advance by the user in the first embodiment and the second embodiment, in the following, there will be detailed such operations to be conducted in the third embodiment that the user inputs the job without designating the allowable delay time, and when determining that the amount of electric power, currently charged in the electrical accumulator section 25, is in short supply for implementing the job concerned, the CPU 11 notifies the user, who inputted the job concerned, of the above-state that the amount of electric power is in short supply, so as to accept the user's operations for determining whether or not the implementation of the job concerned is made to wait.

Figure 13:
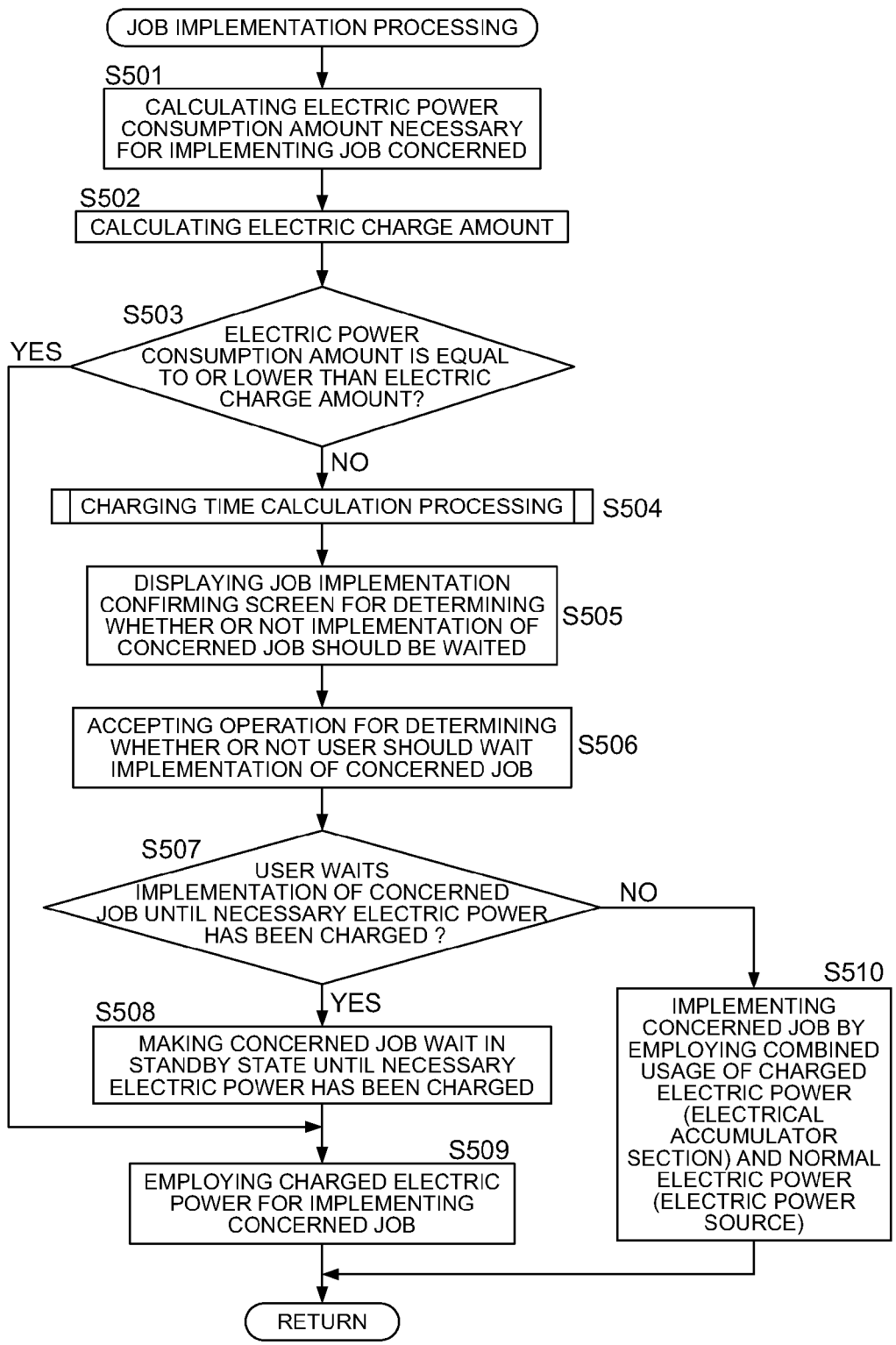
FIG. 13 shows a flowchart indicating a subroutine of a job implementation processing to be conducted by an MFP, embodied in the present invention as the third embodiment.

FIG. 13 shows a flowchart indicating a flow of operations to be conducted by the MFP 10, embodied in the present invention as the third embodiment, when implementing a job. Since the operations to be conducted in the third embodiment, other than operations included in the job implementation processing indicated in the flowchart shown in FIG. 13, are substantially the same as those described in the first embodiment, the explanations for them will be omitted in the following. In this connection, however, the user inputs the job without designating the allowable delay time in the third embodiment as abovementioned. Accordingly, in the job establishing operation to be conducted by the MFP 10 in Step S202 shown in FIG. 6, the allowable delay time is not established. Further, in the case of the print job, the allowable delay time is not established in the operation for establishing the print job, which is to be conducted in the terminal devices 30.

In the third embodiment, the MFP 10 accepts a job (such as a copy job, a facsimile transmission job, a print job, etc.) for which the allowable delay time is not established (Step S101, shown in FIG. 5), and successively, conducts the processing for implementing the job above-accepted (refer to Step S102, shown in FIG. 5).

In the flowchart of the job implementation processing shown in FIG. 13, the CPU 11 calculates the electric power consumption amount, which is necessary for the MFP 10 to implement the job concerned (Step S501), and successively, the CPU 11 calculates the electric charge amount currently stored in the electrical accumulator section 25 (Step S502). The operations for calculating the electric charge amount and the electric charge amount are implemented in the same way as described in the first embodiment (Step S301 and Step S302, shown in FIG. 7).

Successively, the CPU 11 compares the electric power consumption amount and the current electric charge amount with each other (Step S503). When determining that the electric power consumption amount is equal to or lower than the current electric charge amount (the current electric charge amount fulfills the electric power consumption amount) (Step S503; Yes), the CPU 11 changes the power supplying source to the electrical accumulator section 25 in order to employ the charged electric power for activating the MFP 10 so as to implement the job concerned (Step S509 through RETURN).

On the other hand, when determining that the electric power consumption amount exceeds the current electric charge amount (the current electric charge amount is in short supply compared to the electric power consumption amount), the CPU 11 conducts the charging time calculation processing (Step S504). The above operation for calculating the charging time is implemented in the same way as described in the first embodiment (Subroutine shown in FIG. 8).

Successively, the CPU 11 displays a job implementation confirming screen for requesting the user to determine (confirm) whether or not the implementation of the concerned job should be waited (Step S505). In the case of the copy job or the facsimile transmission job, the job implementation confirming screen is displayed on the display section 17 of the MFP 10. In the case of print job, the MFP 10 transmits the instruction for displaying the job implementation confirming screen and the information in regard to the charging time to the terminal devices 30 serving as the requestor (sender) of the print job concerned, so that the job implementation confirming screen can be displayed onto a display section or the like, provided in the terminal devices 30, by executing the driver program installed in the terminal devices 30 concerned.

Figure 14:
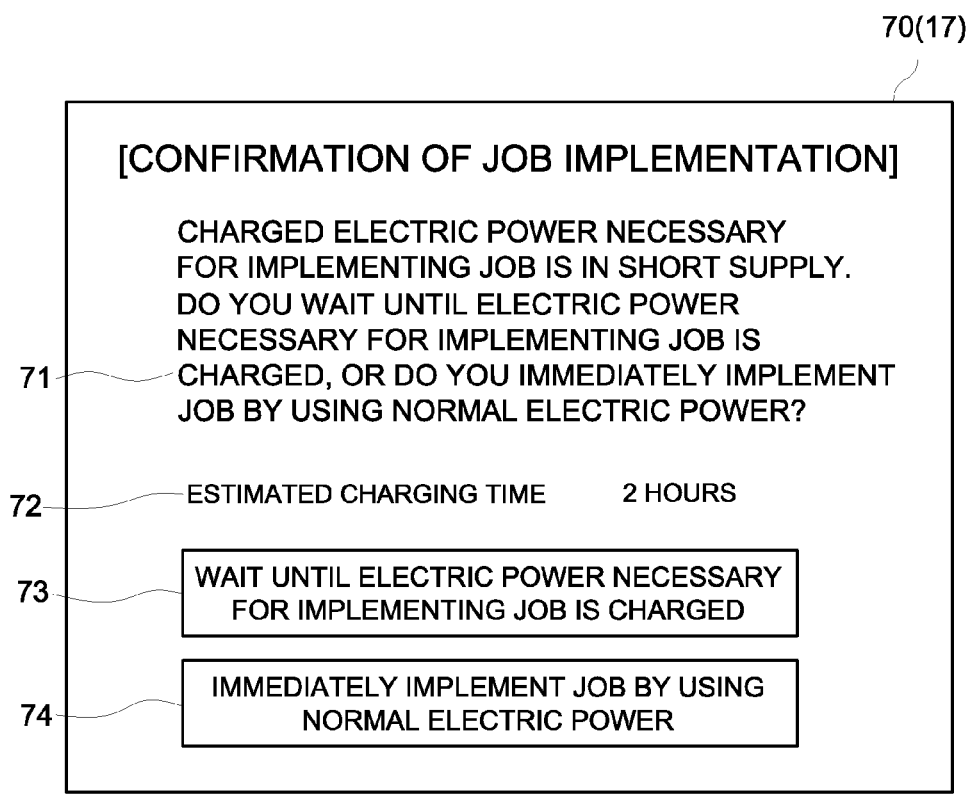
FIG. 14 shows a schematic diagram indicating an example of a job implementation confirming screen, embodied in the present invention as the third embodiment.

FIG. 14 shows a schematic diagram indicating an example of a job implementation confirming screen 70 to be displayed on the display section 17 of the MFP 10 or the display section of the terminal devices 30. In the job implementation confirming screen 70, a message for notifying the user of the shortage of the charged electric power (amount of electric charge, currently charged in the electrical accumulator section 25) necessary for implementing the job concerned, and a notation message 71 for requesting the user to select any one of a waiting mode in which the user waits the implementation of the job until the electric power necessary for implementing the concerned job has been charged and an instant implementation mode in which the concerned job is instantaneously implemented by employing the normal electric power, are displayed. Further, a charging time 72 (estimated charging time) calculated in the above, a first selecting section 73 for selecting the waiting mode and a second selecting section 74 for selecting the instant implementation mode, are also displayed within the job implementation confirming screen 70.

Through the job implementation confirming screen 70, it is possible for the user to grasp the fact that the amount of electric power, currently charged in the electrical accumulator section 25 of the MFP 10, is in short supply for implementing the job inputted by the user himself. Further, it is also possible for the user to grasp the waiting time (=charging time 72) to be consumed until the electric power necessary for implementing the concerned job has been charged. Then, referring to the charging time 72, it becomes possible for the user to select either the waiting mode or the instant implementation mode, defined in the above.

Returning to the flowchart shown in FIG. 13, through the job implementation confirming screen, the CPU 11 accepts the user's selecting operation for determining whether or not the user should wait the implementation of the concerned job (Step S506). Concretely speaking, in the case of the copy job or the facsimile transmission job, the CPU 11 accept the user's selecting operation through the job implementation confirming screen displayed on the MFP 10. On the other hand, in the case of the print job, the CPU 11 of the MFP 10 makes the terminal devices 30 display the job implementation confirming screen so as to accept the user's selecting operation through the job implementation confirming screen displayed on the terminal devices 30, and receives the result of the user's selecting operation therefrom.

When receiving the selection of the waiting mode in which the user waits the implementation of the job until the electric power necessary for implementing the concerned job has been charged (Step S507; Yes), the CPU 11 makes the concerned job wait in a standby state until the electric power necessary for implementing the concerned job has been charged (Step S508). Then, at the time when the electrical accumulator section 25 is sufficiently charged, the CPU 11 changes the electric power source to the electrical accumulator section 25, and employs the charged electric power for activating the MFP 10 so as to implement the concerned job (Step S509 through RETURN).

On the other hand, when receiving the selection of the instant implementation mode in which the concerned job is instantaneously implemented by employing the normal electric power (Step S507; Yes), the CPU 11 changes the electric power source to the combined electric power source of the electrical accumulator section 25 and the electric power source 26, and employs the charged electric power for activating the MFP 10, while employing the normal electric power for compensating for the lack of the charged electric power, so as to instantaneously implement the concerned job (Step S510 through RETURN).

As described in the foregoing, when determining that the amount of electric charge, currently charged in the electrical accumulator section 25, is in short supply for implementing the job inputted by the user, the CPU 11 displays the job implementation confirming screen 70 so as to notify the user of the above-detected shortage of the charged electric power, and accept the user's selection (user's setting) in regard to whether or not the user may wait the implementation of the job concerned. Accordingly, receiving the notification in regard to the above-detected shortage of the charged electric power, the user who inputted the job can grasp (recognize) the fact that it is impossible to implement the job concerned due to the shortage of the charged electric power, and can determine (select) whether or not he should wait the implementation of the job concerned. Therefore, according to the present invention, with respect to every job inputted into the MFP 10 by the user, it becomes possible to appropriately cope with the demands corresponding to the urgency level of the job concerned.

Further, since the charging time 72 waiting time) required for charging the electric power, which is to be employed for implementing the job concerned, is displayed (indicated) within the area of the job implementation confirming screen 70, it becomes possible for the user to determine whether or not the user should wait the implementation of the job concerned, resulting in an easiness of the determining (selecting) operation thereof.

Although the embodiments of the present invention has been detailed in the foregoing while referring to the drawings, the scope of the present invention is not limited to the present embodiments described in the present specification. Various kinds of modifications and additions made by a skilled person without departing from the spirit and scope of the invention shall be included in the scope of the present invention.

Concretely speaking, although the combined usage of the electrical accumulator section 25 (charged electric power) and the electric power source 26 (normal electric power) is employed for instantaneously implementing the job under such a state that an amount of electric charge, currently charged in the electrical accumulator section 25, is in short supply for implementing the job concerned, in the aforementioned embodiment, it is also applicable that only the electric power source 26 is employed in the abovementioned case.

Further, although the combined usage of the electrical accumulator section 25 and the electric power source 26 is employed for instantaneously implementing the job when the charging time of the electrical accumulator section 25 exceeds the allowable delay time, in the aforementioned embodiment, it is also applicable that the implementation of the job concerned is made to wait in a standby state until the allowable delay time, during which the electrical accumulator section 25 is charged with the electric power generated by the electrical accumulator section 25, has elapsed, and then, the concerned job is implemented by employing the combined usage of the electrical accumulator section 25 and the electric power source 26. Alternatively, it is also applicable that the concerned job is implemented by employing the combined usage of the electrical accumulator section 25, which is charged to some extent, and the electric power source 26 within the allowable delay time.

Still further, it is applicable that the allowable delay time can be established in a unit of apparatus or user, other than the unit of the job as described by referring to the embodiment aforementioned. Other than the above, it is also applicable that the allowable delay time can be established in a unit of job kind, such as a copy, a printing, a facsimile transmission, etc. The allowable delay time is established in advance in any one of these units of apparatus, user and job kind. In this connection, even in the case of the abovementioned units, it is possible to employ the allowable delay tune setting table 40, exemplified in the schematic diagram shown in FIG. 4, for storing the allowable delay time established.

Still further, according to the embodiment described in the foregoing, when the allowable delay time of the copy job, the facsimile transmission job, or the like is established in the unit of the job, the allowable delay time currently established is stored in the table. However, other than the above, it is also applicable that the allowable delay time is added to the job (job data) created by the MFP 10 so as to store the allowable delay time therein, as well as the print job generated in the terminal devices 30.

Still further, according to the third embodiment of the present invention, when determining that the electric power charge, currently stored in the electrical accumulator section 25, is in short supply for implementing the job inputted by the user, the MFP 10 notifies the concerned user of the shortage of the charged electric power (including the estimated value of the charging time), so as to accept the user's selection (user's establishment) in regard to whether or not the user may wait the implementation of the job concerned. However, it is also applicable that the MFP 10 accepts the user's establishment of the allowable delay time of the job concerned, instead of the user's selection abovementioned. In this case, receiving the notification of the shortage of the charged electric power, the user can grasp (recognize) the fact that the implementation of the job concerned is impossible due to the shortage of the charged electric power, and then, can determine the user's selection abovementioned. When determining that the user may wait the implementation of the job concerned, the user can instruct the MFP 10 of the selected result while establishing the allowable delay time. In this connection, it is also applicable that the allowable delay time, which is to be established in the above case, is equal to or longer or shorter than the charging time (estimated value) indicated herein. For instance, when the user cannot wait the implementation of the job concerned, he may established the allowable delay time at zero (0), while when the user can wait the implementation of the job concerned, he may established the allowable delay time at such a time interval that is acceptable for the user. Therefore, according to the present invention, with respect to every job inputted into the MFP 10 by the user, it becomes possible to appropriately cope with the demands corresponding to the urgency level and the time schedule of the job concerned.

Still further, although the aforementioned embodiment is so constituted that the time interval for recharging all of the shortage part of the electric power amount, which is in short supply for implementing the job, (shortage part of the electronic charge amount, currently stored in the electrical accumulator section 25, versus the consumption amount of the electric power to be actually consumed for implementing the concerned job by the MFP 10), is found as the charging time abovementioned, it is also applicable that any other condition for indicating the charging time, required for charging the electrical accumulator section 25, is indicated to the user who inputted the job concerned. For instance, it is also applicable that a charging time required for charging a predetermined ratio (for example, 50%, 80%, etc.) of the shortage part of the electronic charge amount, currently stored in the electrical accumulator section 25; another charging time required for charging a predetermined ratio (for example, 50%, 80%, 100%, etc.) of the all electric power to be stored in the electrical accumulator section 25; or the like, is found, so as to indicate the above-calculated charging time to the user who inputted the job concerned.

Still further, although the MFP 10, exemplified as the embodiment of the present invention, is so constituted that, when determining that the electric power charge, currently stored in the electrical accumulator section 25, is in short supply for implementing the job inputted by the user, the MFP 10 also indicates the charging time (estimated value) in addition to the message for notifying the concerned user of the shortage of the charged electric power, it is also applicable not to indicate the charging time.

Still further, although the MFP 10, exemplified as the embodiment of the present invention, is so constituted that, when determining that the electric power charge, currently stored in the electrical accumulator section 25, is in short supply for implementing the job inputted by the user, the MFP 10 notifies the concerned user of the shortage of the charged electric power, and then, accepts the user's establishment in regard to whether or not the user may wait the implementation of the job concerned, it is also applicable that the MFP 10 accepts the abovementioned user's establishment in advance at the time when the user initially sets the job concerned (when inputting the job concerned).

Yet further, it is needless to say that the scope of the image processing apparatus embodied in the present invention is not limited to the MFP (Multi-Functional Peripherals) described as the preferred embodiment of the present invention in the foregoing, but includes other image processing apparatuses, such as a copier, a printer, a facsimile device, etc.

According to the image processing apparatus embodied in the present invention, it becomes possible not only to implement a job by effectively employing the charged electric power, generated and stored by the locally-equipped power generator, but also to cope with such a job whose urgency level is specifically high. Accordingly, it becomes possible to make the urgency level and the energy saving effect, which are to be required when implementing the job concerned, compatible with each other.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus connectable to an external electrical power source, comprising:
 a job implementing section to implement a job in regard to image data;
 an electric generator section;
 an electrical accumulator section to accumulate an electric power generated by the electric generator section; and
 a controlling section configured to:
  calculate a charging time necessary to accumulate, in the electrical accumulator section, the electric power sufficient for implementing the job,
  compare the charging time with an allowable delay time set by the user,
  when the charging time is equal to or smaller than the allowable delay time, set a job implementing mode of the job implementing section to a first job implementation mode in which the job is implemented by employing the electrical accumulator section without employing the external electric power source, and
  when the charging time is larger than the allowable delay time, set the job implementing mode of the job implementing section to a second job implementation mode in which the job is implemented by employing at least the external electric power source,
 wherein, when the amount of electric power charge, currently stored in the electrical accumulator section, is in short supply for implementing the job, the controlling section further notifies the user, who inputted the job concerned, of a message indicating a shortage of electric power charge being necessary for implementing the job, and accepts the user's operation for establishing the allowable delay time.

2. The image processing apparatus of claim 1, wherein, when the amount of electric power charge, currently stored in the electrical accumulator section, is in short supply for implementing the job, the controlling section further notifies the user of the charging time in addition to the message.

3. The image processing apparatus of claim 1, wherein the allowable delay time is established in advance.

4. The image processing apparatus of claim 1, wherein, in the first job implementation mode, the job is implemented after the electric power charging operation has been completed, even if the allowable delay time has not elapsed.

5. An image processing apparatus connectable to an external electrical power source, comprising:
 a job implementing section to implement a job in regard to image data;
 an electric generator section;
 an electrical accumulator section to accumulate an electric power generated by the electric generator section; and
 a controlling section configured to:
  calculate a charging time necessary to accumulate, in the electrical accumulator section, the electric power sufficient for implementing the job,
  compare the charging time with an allowable delay time set by the user,
  when the charging time is equal to or smaller than the allowable delay time, set a job implementing mode of the job implementing section to a first job implementation mode in which the job is implemented by employing the electrical accumulator section without employing the external electric power source, and
  when the charging time is larger than the allowable delay time, set the job implementing mode of the job implementing section to a second job implementation mode in which the job is implemented by employing at least the external electric power source, wherein the job is defined as a reserved job, an implementation commencement time of which is designated in advance, and wherein the controlling section further determines whether or not the amount of electric power charge, currently stored in the electrical accumulator section, is in short supply for implementing the reserved job, at the implementation commencement time of the reserved job.

6. An image processing apparatus connectable to an external electrical power source, comprising:

a job implementing section to implement a job in regard to image data;

an electric generator section;

an electrical accumulator section to accumulate an electric power generated by the electric generator section; and a controlling section configured to:

calculate a charging time necessary to accumulate, in the electrical accumulator section, the electric power sufficient for implementing the job, compare the charging time with an allowable delay time set by the user, when the charging time is equal to or smaller than the allowable delay time, set a job implementing mode of the job implementing section to a first job implementation mode in which the job is implemented by employing the electrical accumulator section without employing the external electric power source, and when the charging time is larger than the allowable delay time, set the job implementing mode of the job implementing section to a second job implementation mode in which the job is implemented by employing at least the external electric power source, wherein, in the second job implementation mode, the job is implemented by further employing the electrical accumulator section after the electrical accumulator section is charged by the electric power generated by the electric generator section within the allowable delay time.

7. An image processing apparatus connectable to an external electrical power source, comprising:

a job implementing section to implement a job in regard to image data;

an electric generator section;

an electrical accumulator section to accumulate an electric power generated by the electric generator section; and a controlling section configured to:

calculate a charging time necessary to accumulate, in the electrical accumulator section, the electric power sufficient for implementing the job, compare the charging time with an allowable delay time set by the user, when the charging time is equal to or smaller than the allowable delay time, set a job implementing mode of the job implementing section to a first job implementation mode in which the job is implemented by employing the electrical accumulator section without employing the external electric power source, and when the charging time is larger than the allowable delay time, set the job implementing mode of the job implementing section to a second job implementation mode in which the job is implemented by employing at least the external electric power source, wherein, accepting the user's establishment in regard to whether or not the user, who inputted the job, may wait an implementation of the job, the controlling section further switches the job implementation mode between the first job implementation mode and the second job implementation mode, based on predetermined decision criteria including the user's establishment.

8. The image processing apparatus of claim 7, wherein, when the amount of electric power charge, currently stored in the electrical accumulator section, is in short supply for implementing the job, the controlling section further notifies the user, who inputted the job concerned, of a message indicating a shortage of electric power charge being necessary for implementing the job, and accepts the user's establishment.

9. The image processing apparatus of claim 8, wherein, when the amount of electric power charge, currently stored in the electrical accumulator section, is in short supply for implementing the job, the controlling section notifies the user of the charging time in addition to the message.

10. A method for controlling a job implementation process to be conducted in an image processing apparatus that is connectable with an external power source and includes a job implementing section to implement a job in regard to image data, an electric generator section and an electrical accumulator section to accumulate an electric power generated by the electric generator section, the method comprising:

calculating a charging time necessary to accumulate, in the electrical accumulator section, the electric power sufficient for implementing the job;

comparing the charging time with an allowable delay time set by the user;

when the charging time is equal to or smaller than the allowable delay time, setting a job implementing mode of the job implementing section to a first job implementation mode in which the job is implemented by employing the electrical accumulator section without employing the external electric power source;

when the charging time is larger than the allowable delay time, setting the job implementing mode of the job implementing section to a second job implementation mode in which the job is implemented by employing at least the external electric power source;

notifying the user, who inputted the job concerned, of a message indicating a shortage of electric power charge being necessary for implementing the job, when the amount of electric power charge, currently stored in the electrical accumulator section, is in short supply for implementing the job; and accepting the user's operation for establishing the allowable delay time after notifying the user of the message.

11. The method of claim 10, further comprising:

notifying the user of the charging time in addition to the message, when the amount of electric power charge, currently stored in the electrical accumulator section, is in short supply for implementing the job.

12. The method of claim 10, wherein in the first job implementation mode, the job is implemented after the electric power charging operation has been completed, even if the allowable delay time has not elapsed.

13. A method for controlling a job implementation process to be conducted in an image processing apparatus that is connectable with an external power source and includes a job implementing section to implement a job in regard to image data, an electric generator section and an electrical accumulator section to accumulate an electric power generated by the electric generator section, the method comprising:

calculating a charging time necessary to accumulate, in the electrical accumulator section, the electric power sufficient for implementing the job;

comparing the charging time with an allowable delay time set by the user;

when the charging time is equal to or smaller than the allowable delay time, setting a job implementing mode of the job implementing section to a first job implementation mode in which the job is implemented by employing the electrical accumulator section without employing the external electric power source;

when the charging time is larger than the allowable delay time, setting the job implementing mode of the job implementing section to a second job implementation mode in which the job is implemented by employing at least the external electric power source; and accepting the user's establishment in regard to whether or not the user, who inputted the job, may wait an implementation of the job, wherein, based on predetermined decision criteria including the user's establishment, the job implementation mode is made to switch between the first job implementation mode and the second job implementation mode.

14. A non-transitory computer readable storage medium storing a computer executable program for implementing a job in an image processing apparatus that is connectable to an external power source and includes a job implementing section to implement the job in regard to image data, an electric generator section and an electrical accumulator section to accumulate an electric power generated by the electric generator section, the program being executable by a computer to cause the computer to perform a process comprising:

calculating a charging time necessary to accumulate, in the electrical accumulator section, the electric power sufficient for implementing the job;

comparing the charging time with an allowable delay time set by the user;

when the charging time is equal to or smaller than the allowable delay time, setting a job implementing mode of the job implementing section to a first job implementation mode in which the job is implemented by employing the electrical accumulator section without employing the external electric power source, and when the charging time is larger than the allowable delay time, setting the job implementing mode of the job implementing section to a second job implementation mode in which the job is implemented by employing at least the external electric power source;

notifying the user, who inputted the job concerned, of a message indicating a shortage of electric power charge being necessary for implementing the job, when the amount of electric power charge, currently stored in the electrical accumulator section, is in short supply for implementing the job; and accepting the user's operation for establishing the allowable delay time after notifying the user of the message.

15. The non-transitory computer readable storage medium of claim 14, wherein the process further comprising:

notifying the user of the charging time in addition to the message, when the amount of electric power charge, currently stored in the electrical accumulator section, is in short supply for implementing the job.

16. The non-transitory computer readable storage medium of claim 14, wherein in the first job implementation mode, the job is implemented after the electric power charging operation has been completed, even if the allowable delay time has not elapsed.

17. A non-transitory computer readable storage medium storing a computer executable program for implementing a job in an image processing apparatus that is connectable to an external power source and includes a job implementing section to implement the job in regard to image data, an electric generator section and an electrical accumulator section to accumulate an electric power generated by the electric generator section, the program being executable by a computer to cause the computer to perform a process comprising:

calculating a charging time necessary to accumulate, in the electrical accumulator section, the electric power sufficient for implementing the job;

comparing the charging time with an allowable delay time set by the user;

when the charging time is equal to or smaller than the allowable delay time, setting a job implementing mode of the job implementing section to a first job implementation mode in which the job is implemented by employing the electrical accumulator section without employing the external electric power source; and accepting the user's establishment in regard to whether or not the user, who inputted the job, may wait an implementation of the job, wherein, based on predetermined decision criteria including the user's establishment, the job implementation mode is made to switch between the first job implementation mode and the second job implementation mode.

* * * * *